(12) United States Patent
Hoile

(10) Patent No.: US 7,161,596 B2
(45) Date of Patent: Jan. 9, 2007

(54) DISPLAY LOCATION CALCULATION MEANS

(75) Inventor: Cefn R Hoile, Ipswich (GB)

(73) Assignee: British Telecommunications public limited company, London (GB)

( * ) Notice: Subject to any disclaimer, the term of this patent is extended or adjusted under 35 U.S.C. 154(b) by 399 days.

(21) Appl. No.: 10/496,691

(22) PCT Filed: Dec. 20, 2002

(86) PCT No.: PCT/GB02/05846

§ 371 (c)(1),
(2), (4) Date: May 26, 2004

(87) PCT Pub. No.: WO03/056505

PCT Pub. Date: Jul. 10, 2003

(65) Prior Publication Data
US 2005/0104849 A1  May 19, 2005

(30) Foreign Application Priority Data
Dec. 21, 2001  (EP) .................................. 01310832

(51) Int. Cl.
*A61B 5/00* (2006.01)
(52) U.S. Cl. ...................... 345/427; 345/418; 345/419; 345/421; 348/42; 348/47; 348/50; 356/12; 356/14; 382/154; 600/429
(58) Field of Classification Search ................ 345/418, 345/419, 421, 422, 427, 700; 348/42, 47, 348/50; 356/12, 14; 382/154; 600/429
See application file for complete search history.

(56) References Cited

U.S. PATENT DOCUMENTS

| 5,481,622 A | 1/1996 | Gerhardt et al. |
| 5,528,263 A | 6/1996 | Platzker et al. |
| 5,554,980 A | 9/1996 | Hashimoto et al. |

(Continued)

FOREIGN PATENT DOCUMENTS

EP  0 767 443  4/1997

(Continued)

OTHER PUBLICATIONS

Welch et al., "The HiBall Tracker: High-Performance Wide-Area Tracking for Virtual and Augmented Environments", Symposium on Virtual Reality Software and Technology, University College London, Dec. 20-22, 1999.

(Continued)

*Primary Examiner*—Bipin Shalwala
*Assistant Examiner*—Vincent E. Kovalick
(74) *Attorney, Agent, or Firm*—Nixon & Vanderhye P.C.

(57) ABSTRACT

Display location calculation means and methods for calculating a display location are disclosed. It has become common for users to indicate a point on a display in order to communicate with a machine. It is therefore necessary to be able to calculate the location on the display that is being indicated by the user. A display generator (123) is arranged in operation to generate a display in response to display data generated by a machine (111). A camera operable to generate image data representing at least part of the scene within the field of view of the camera (which part, includes at least a portion of the display) is carried in a pointer device (103). Computation means (111, 113, 115) are arranged in operation to receive the image data and the display data and to calculate from these data sets the position and/or orientation of the pointer device (103) relative to the display. A display location can then be calculated from the calculated position and/or orientation.

21 Claims, 10 Drawing Sheets

U.S. PATENT DOCUMENTS

| | | | |
|---|---|---|---|
| 5,737,028 A | | 4/1998 | Bertram et al. |
| 5,848,967 A | * | 12/1998 | Cosman .................. 600/426 |
| 6,152,563 A | | 11/2000 | Hutchinson et al. |
| 6,167,295 A | * | 12/2000 | Cosman .................. 600/426 |
| 6,230,116 B1 | | 5/2001 | Ronen et al. |
| 6,980,690 B1 | * | 12/2005 | Taylor et al. ............. 382/154 |
| 2001/0022575 A1 | | 9/2001 | Woflgang |
| 2001/0050720 A1 | * | 12/2001 | Karube et al. ............ 348/373 |

FOREIGN PATENT DOCUMENTS

| | | |
|---|---|---|
| EP | 9767443 A2 | 4/1997 |
| EP | 1130906 A2 | 9/2001 |
| JP | 08044490 A | 2/1996 |
| JP | 08095707 A | 4/1996 |
| WO | WO 00/60534 | 10/2000 |

OTHER PUBLICATIONS

Thomas et al, "A Versatile Camera Position Measurement System for Virtual Reality TV Production", International Broadcasting Convention (IBC 97), pp. 284-289, Amsterdam, Sep. 12-16.

Chesi et al., "Collineation Estimation from Two Unmatched Views of an Unknown Planar Contour for Visual Serving", Proceedings of 10th British Machine Vision Conference, Nottingham, UK, 1999.

"Using Projective Geometry to Recover Planar Surfaces in Stereovision", Pattern Recognition (29), pp. 533-438, 1996.

* cited by examiner

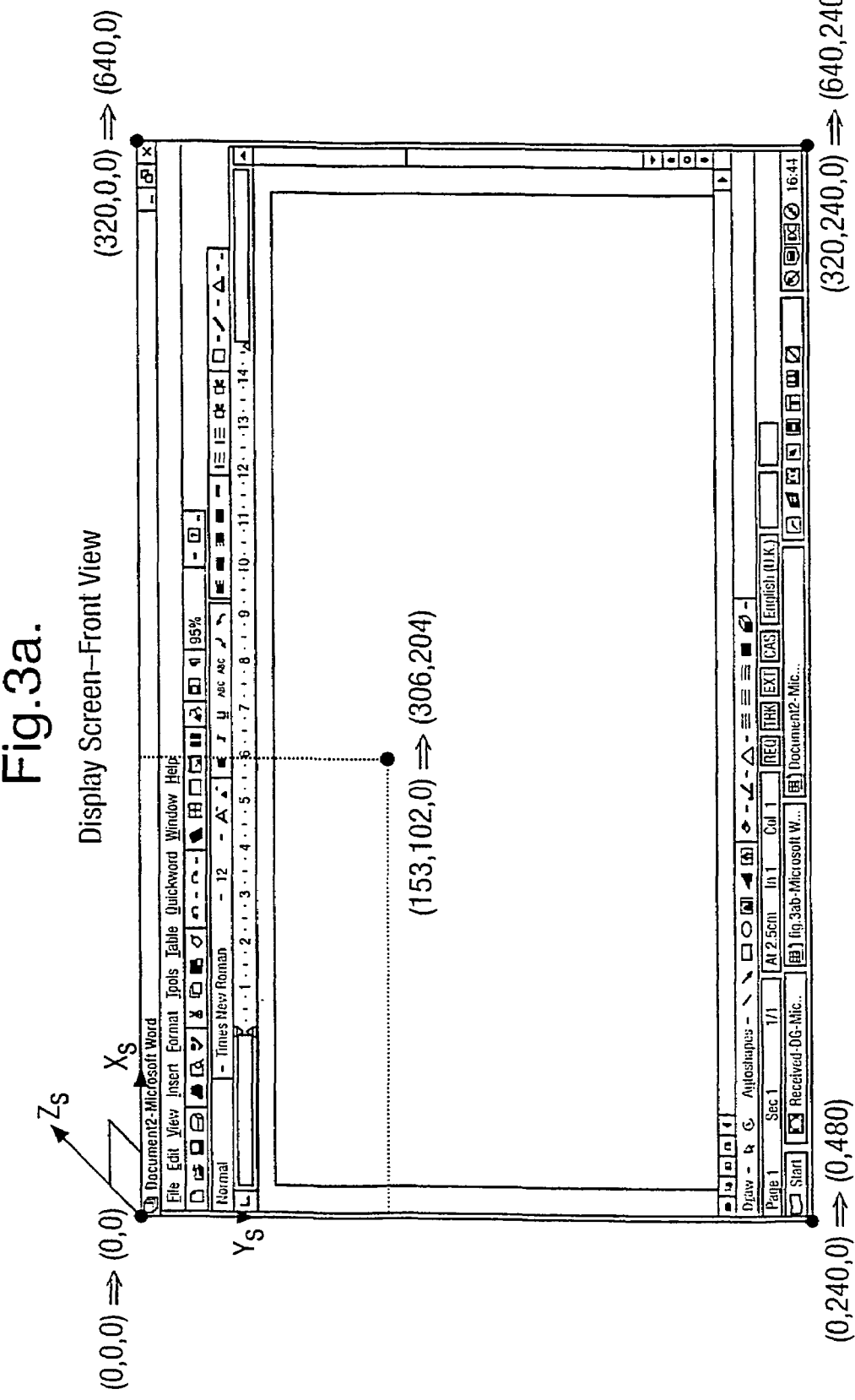

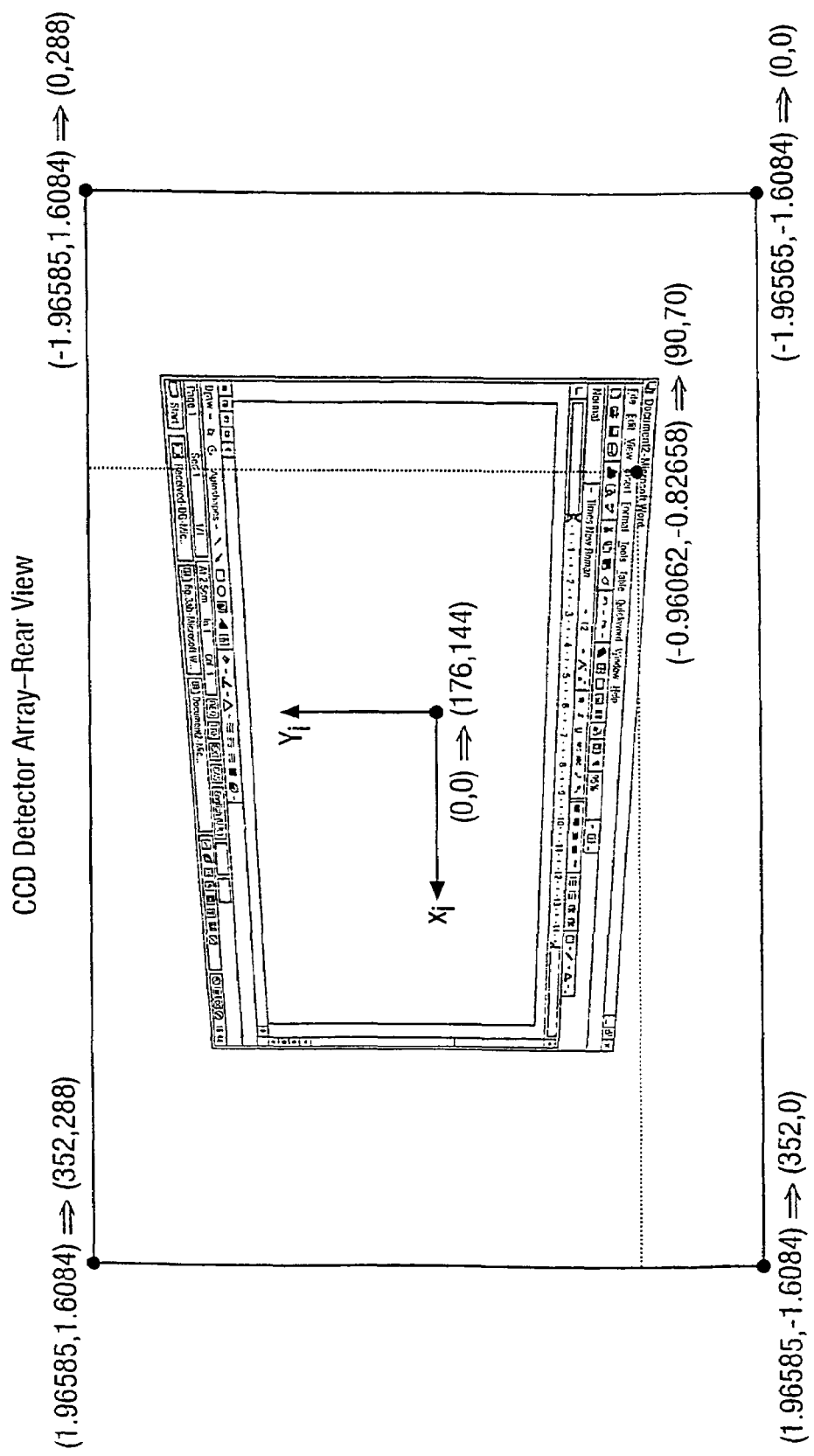

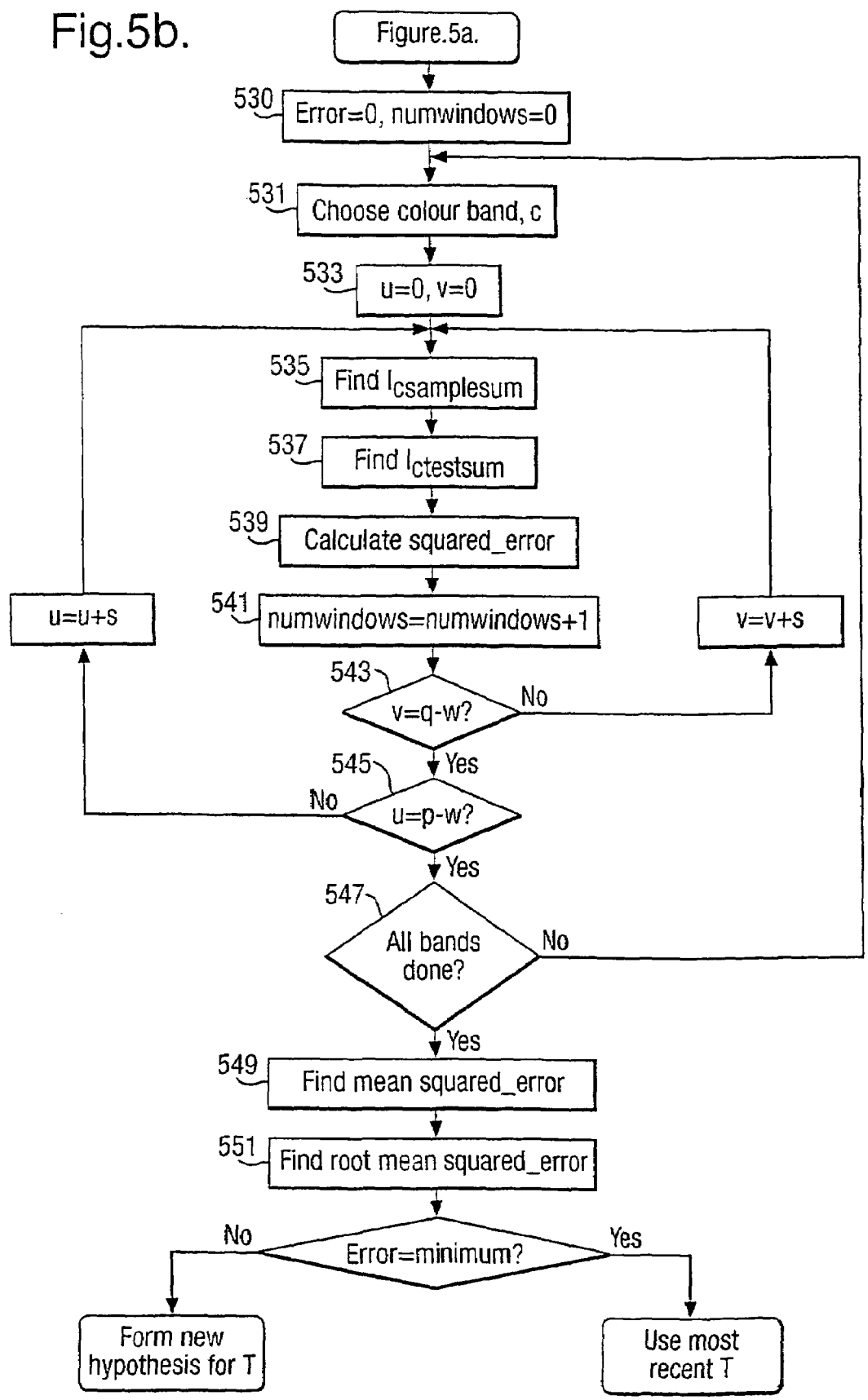

DISPLAY LOCATION CALCULATION MEANS

This application is the US national phase of international application PCT/GB02/05846 filed 20 Dec. 2002 which designated the U.S. and claims benefit of EP 01310832.9, dated 21 Dec. 2001, the entire content of which is hereby incorporated by reference.

This invention relates to display location calculation means and to methods for calculating a display location for use particularly, but not exclusively, with computers.

Users often need to communicate with machines and sometimes they need to control them too. It has become increasingly common for this to be done by the user indicating a point on a display. It is therefore necessary to be able to calculate the location on the screen that is being indicated by the user. Often, the display also informs the user of the status of the machine.

An early example of display location calculation means for a computer used a cathode ray tube (CRT) screen for status display and a light pen for indication. Such light pens housed a photodetector which produced a signal on detecting a sharp increase in received light intensity. That signal was sent to the computer driving the CRT display. To indicate a point on the display the user pressed the tip of the light pen against that point. By monitoring the timing of the passage of the electron beam from the cathode ray tube, the computer was able to calculate the point of contact, i.e. the display location.

In recent years, devices which do not require contact with the screen have become popular. By far the most common means for indicating a point on a display is the computer mouse. However, a computer mouse requires a flat, non-slip surface for use and can collect dirt from that surface which then spoils its operation over time.

Non-contact devices are used for indicating a point on a display in some specialised interfaces. Examples include light guns used as video game controllers. Light guns operate in the same way as light pens but at a distance from the display. Non-contact computer mice are also available. None of these non-contact devices are entirely satisfactory however.

According to a first aspect of the present invention there is provided display location calculation means comprising:
  a display generator arranged in operation to generate a display in accordance with display data generated by a machine;
  a pointer device carrying a camera operable to generate image data representing at least part of the scene within the field of view of the camera, which part in use, includes an image of at least a portion of the display;
computation means arranged in operation to:
receive said image data;
receive said display data;
calculate, from said image data and said display data, the position and/or orientation of said pointer device relative to said display;
calculate a display location from said calculated position and/or orientation.

By obtaining display data representing a display and image data representing the display as viewed by a camera carried by the pointer device, the position and/or orientation of the pointer device relative to the display can be calculated. Hence a display location can be calculated. The pointer device does not require complex, mechanical parts, works with different display generator technologies (e.g. CRT, liquid crystal display (LCD), plasma screens etc.) and need not be placed in contact with the screen or any other surface in use.

Preferably the pointer device is elongate in shape and the display location is the point where the longitudinal axis of said pointer device intersects with the display. In preferred embodiments a cursor is included in the display at the display location; the position of the cursor varies in accordance with the calculated position and/or orientation of the pointer device relative to the display. In this way it is easier for the user to see the point which they are indicating.

Once a user has control of a cursor which is included in a display it is desirable to be able to control the machine. Nowadays, most machines provide a user interface arrangement to enable a user to control their operation. Normally, an interface will include some means for inputting user commands and some means for indicating to the user the status of the machine responsive to those commands. A user can input different commands to the machine by indicating different parts of the display.

According to a second aspect of the present invention there is therefore provided an interface arrangement for providing an interface between a user and a machine comprising:
display location calculation means according to the first aspect of the present invention wherein said computation means is further arranged in operation to control said machine in accordance with the position of the cursor.

In this way, a user can control a machine without needing to learn any special manipulative skills. Furthermore, the need for lots of remote control buttons and the need for strong integration of remote control hardware and interface design found in some interface arrangements is reduced or obviated altogether. Many different types of machine provide such an interface including, for example, personal computers, digital television receivers, video cassette recorders (VCR) and digital video disk (DVD) players.

Preferably the machine comprises a computer having a processor wherein the computation means comprises the processor. By using the computer's processor to carry out the necessary calculation, the requirement for processing power elsewhere in the interface arrangement is reduced or obviated altogether. Alternatively the computation means could also comprise more than one processor, placed alone or together, in the pointer device or remote from it.

Preferably the camera is a digital video camera since the captured image will then be in the same format as the display image and hence readily available for image registration (a process to determine the parameters of the transformation required to bring an image into alignment with another image). If the camera were a fixed focus camera with a very small depth of field, the image would only be in focus at a certain distance from the screen. When a focussed image is obtained the distance to the screen could be known. Hence the processing required in the calculation will be reduced. In order to keep the calculation simple, in preferred embodiments, the camera has a fixed spatial relationship with the pointer device.

According to a third aspect of the present invention there is provided a method of calculating a display location comprising the steps of:
i. generating a display in accordance with display data generated by said machine;
ii. capturing image data representing at least part of the scene within the field of view of a camera carried by a pointer device wherein at least a portion of said display is included in said field of view;

iii. calculating from said image data and said display data the position and/or orientation of said pointer device relative to said display;

iv. calculating a display location from said calculated position and/or orientation.

By comparing display data generated by a machine and representing a display with image data representing the display as viewed by a camera which is part of a pointer device, the position and/or orientation of the pointer device relative to the display can be calculated irrespective of the way in which the display is refreshed. Based on the results of the calculation, a display location can then be calculated enabling a user to indicate a point on a display.

In preferred embodiments the history of the position and/or orientation of said pointer device relative to said display is used as an additional variable in the position and/or orientation calculation step. This is preferred because starting with a good estimate of the correct position and/or orientation will reduce the processing required to calculate the current position and/or orientation.

According to a fourth aspect of the present invention there is provided display location calculation means including:

a storage medium having recorded therein processor readable code processable to provide an interface between a user and a machine said code comprising:

display data acquisition code processable to obtain display data representing a display image data acquisition code processable to obtain from a pointer device carrying a camera, image data representing at least part of the scene within the field of view of said camera;

position/orientation calculation code processable to calculate from said display data and said image data the position and/or the orientation of said pointer device relative to said display display location calculation code processable to calculate from said calculated position and/or orientation a display location.

According to a fifth aspect of the present invention there is provided a digital data carrier carrying a program of instructions executable by processing apparatus to perform the method steps as set out in the third aspect of the present invention.

Embodiments of the present invention will now be described, by way of example only, with reference to the accompanying drawings, wherein like reference numbers refer to like parts, and in which:

FIG. 3a illustrates a display-based, 3D, right-handed, rectangular coordinate system;

FIG. 3b illustrates an image-based, 2D, right-handed, rectangular coordinate system;

FIG. 5b is a flow diagram showing in greater detail the stage in the mapping parameter establishment step of FIG. 4 that compares the test image and camera image in order to establish the actual mapping parameters;

Figure 1:
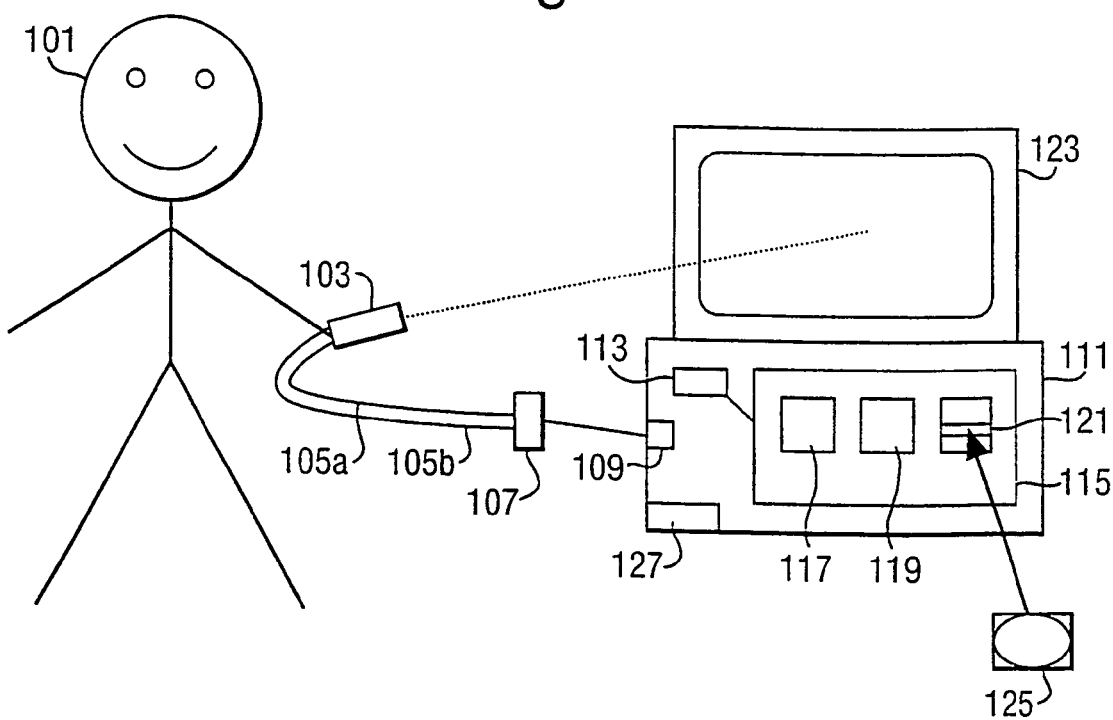
FIG. 1 illustrates a user operating a pointer device in accordance with an embodiment of the present invention.
Figure 2A:
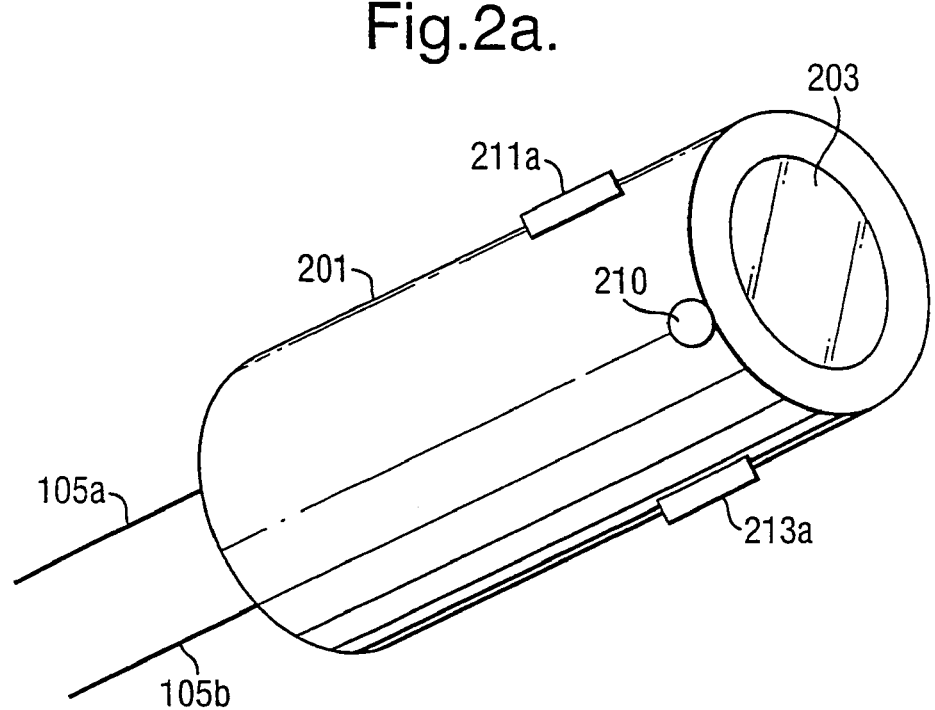
FIG. 2a is a perspective view of the pointer device.
Figure 2B:
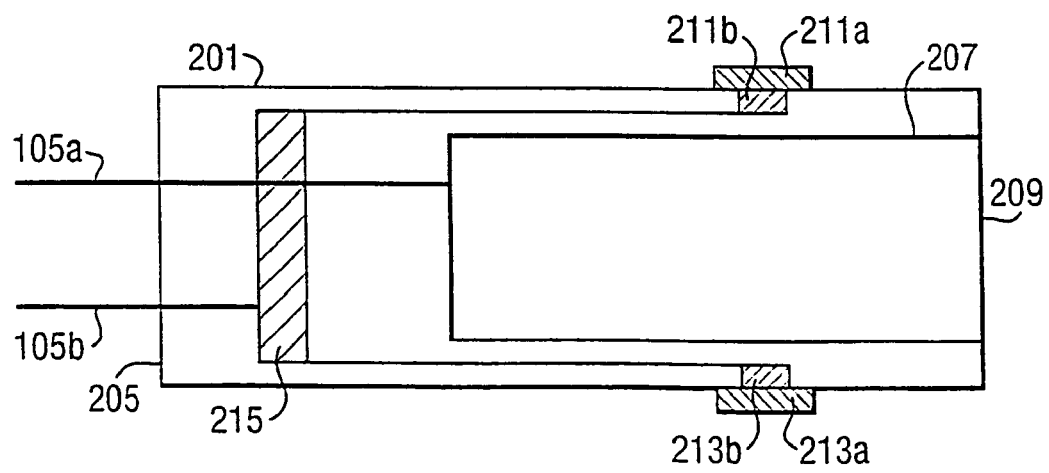
FIG. 2b is a cross-sectional representation of the pointer device.
Figure 2B:
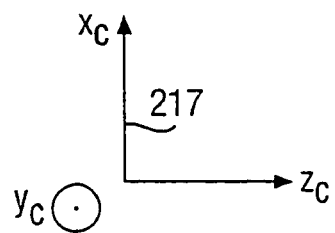

FIG. 1 shows a user 101 operating a pointer device 103 connected via cables 105a/105b to a Universal Serial Bus (USB) hub 107 which itself is connected to the USB port 109 of a computer 111. The pointer device 103 (FIGS. 2a and 2b) comprises a housing 201 elongate in shape and arranged and sized to be held in the hand of a user. The housing has a window 203 at a forward end and a rear wall 205 at the rearward end. The housing 201 houses a camera 207 (with centre of aperture 209) which is longitudinally oriented so as to have a view through the window 203 at the forward end of the housing 201. A suitable camera is the Logitech Quickcam® VC (USB version) although any digital video camera with a USB port, being sufficiently small to be placed inside such a housing, will suffice. The focussing mechanism of the camera is fixed so as to cause a focussed image of an object to be created on the CCD detector array when the object is 300 mm from the camera. Light emitting diode (LED) 210 is provided to indicate to the user that the captured image is in focus. Someone skilled in the art would have no problems in implementing a suitable algorithm to provide this feedback.

The electronic signal output by the camera 207 representing the view through the window 203 is transmitted to the computer 111 via one of the USB cables 105a. The cable 105a leads from the camera 207 through the rear wall 205 of the housing 201 and terminates in a USB connector which is attached in use to the USB hub 107. The USB hub 107 is plugged in use into the USB port 109 of the computer 111. The camera 207 draws its power from the USB connection.

Two buttons 211a/213a are located on each lateral side of the housing 201 towards its forward end. Two switches 211b/213b are provided inwardly of each button 211a/213a and are controlled by the depression of the button 211a/213a. A wire leads from each switch 211b/213b to a circuit board 215 positioned at the rearward end of the housing 201. The state of the switches 211b/213b is transmitted to the computer 111 via the other USB cable 105b which leads from the circuit board 215 through the rear wall 205 of the housing 201 and terminates in a USB connector which is attached in use to the USB hub 107.

Referring once again to FIG. 1, the computer 111 comprises a central processing unit (CPU) 113 and a storage system 115. The storage system 115 comprises:

a) a random access memory 117;
b) a first storage device 119 (e.g. a hard disk) storing the CPU operating program and image data;
c) a second storage device 121 (e.g. a floppy disk drive or CD/DVD drive) for reading data from and/or writing data to a removable storage medium 123.

The computer further comprises a network card 125 for interfacing to a network.

The CPU 113 is in communication with the storage system 115. The output of the computer 111 is displayed on a display screen 123. In the current embodiment the display screen 123 is an LCD screen. It is possible, however, to use a CRT screen instead of the LCD screen. In such a case it will be realised that a flashing effect similar to that seen when CRTs are captured on television may result if the camera captures frames too rapidly. It would therefore be necessary to extend the period of capture to a larger fraction of a second thus ensuring that the peaks of the CRT output are smoothed over.

Although FIG. 1 shows the pointer device 103 connected to the computer 111 via cables it will be apparent that a wireless connection, such as a radio or infra-red connection, could be used allowing the user 101 more freedom of movement. This would be particularly useful if the user 101 was giving a presentation and needed to move around a stage area. In this case the camera would draw its power from rechargeable batteries placed within the housing. The batteries would be recharged by placing the pointing device in an appropriately powered recharging bay. Those skilled in the art would have no difficulty in making the appropriate modifications.

Different rectangular coordinate systems can be used to describe the real world space occupied by the display screen, the camera and the image formed inside the camera.

A display-based, 3D, right-handed, rectangular coordinate system (FIG. 3a) allows the position of a point within the real world space to be defined by three coordinates [$X_s$, $Y_s$, $Z_s$]. The unit of distance of the axes is mm. In accordance with the display-based coordinate system, the display screen 123 occupies a rectangular portion of the plane $z_s=0$. The $x_s$-axis runs horizontally along the top edge of the display from the origin (0,0,0) to the top right-hand corner (320,0,0) and the $y_s$-axis runs down the left-hand side of the display to the bottom left-hand corner (0,240,0). Hence the display screen fills an area of 320×240 mm.

The display screen offers VGA (video graphics array) (640×430 pixels) resolution. The mapping of the corners of the display screen (defined in the display-based coordinate system) to display screen pixels ($x_{sp}$,$y_{sp}$) is shown in the table below:

| ($x_s$, $y_s$, $z_s$) | ($x_{sp}$, $y_{sp}$) |
|---|---|
| (0, 0, 0) | (0, 0) |
| (320, 0, 0) | (640, 0) |
| (0, 240, 0) | (0, 480) |
| (320, 240, 0) | (640, 480) |

Hence it will be realised that the relationship between the display-based coordinate system and the display-screen pixels is:

($x_s$,$y_s$,$z_s$)⇔(½$x_{sp}$,½$y_{sp}$) for 0≤$x_{sp}$≤640 & 0≤$y_{sp}$480      Relation 1:

A camera-based, 3D, right-handed, rectangular coordinate system (217 FIG. 2b) is defined by three coordinates [$X_c$, $Y_c$, $Z_c$]. In the camera-based coordinate system, the centre of the camera lens system 209 occupies the position (0, 0, 0) and the line of view of the camera points down the $z_c$-axis towards increasing values of $z_c$. The $y_c$-axis extends laterally in the direction towards the top of the camera and the $x_c$-axis extends laterally and leftward of the camera when viewed from behind the camera. The unit of distance for the axes is mm.

Figure 3C:
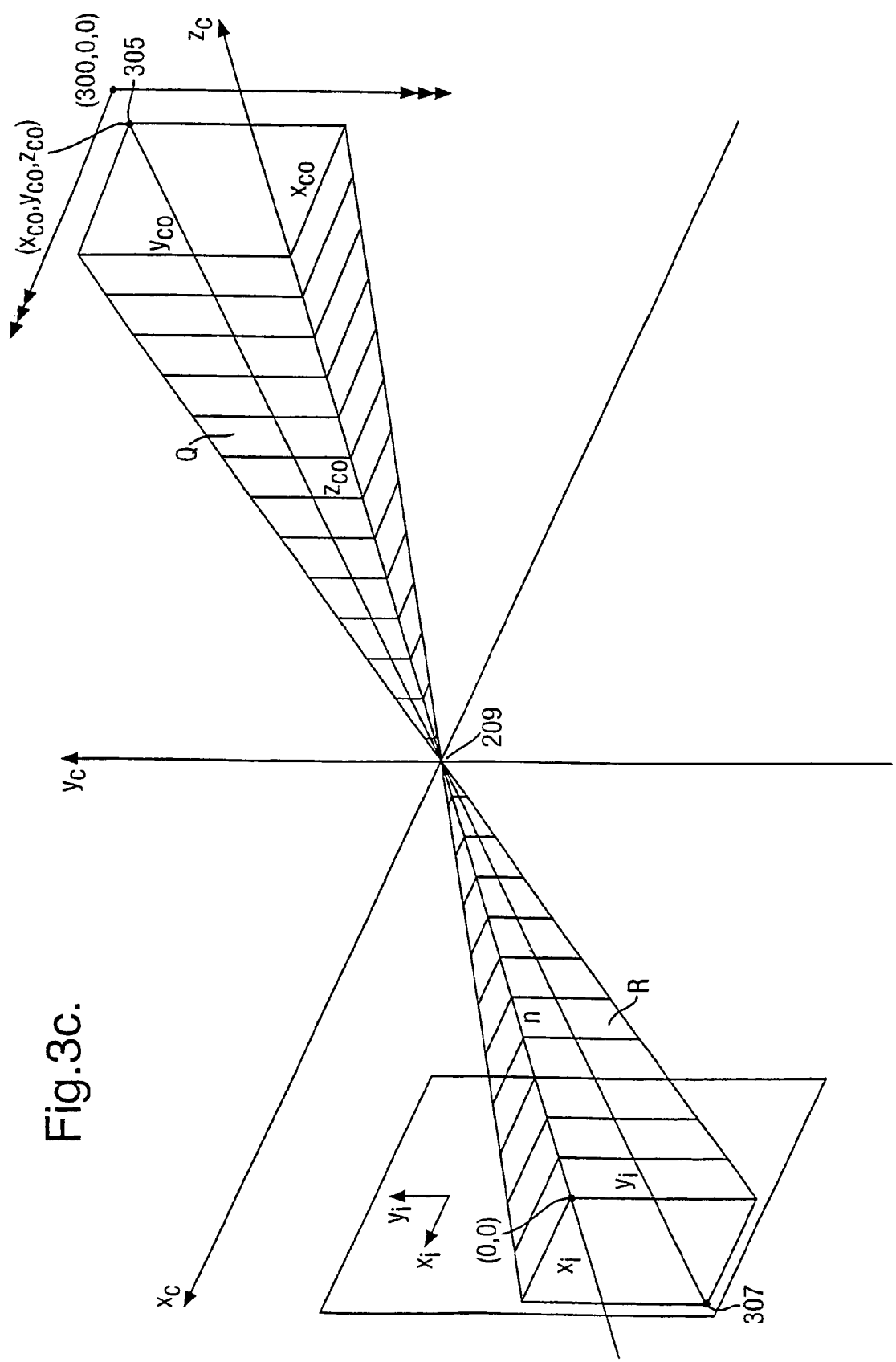
FIG. 3c is a diagram illustrating the projection from a camera-based coordinate system to an image-based coordinate system.

Turning now to FIG. 3c, an object point 305 in the field of view of the camera viewed through the centre of the camera's lens system 209 forms an image point 307 on the CCD detector array inside the camera. The object point 305 is at a position ($x_{co}$,$y_{co}$,$z_{co}$) in the camera-based coordinate system. The image point is on the plane $z_c=-n$ where n is the distance between the centre of the camera lens system 209 and the CCD detector array in mm.

An image-based, 2D, right-handed, rectangular coordinate system (FIG. 3b) is defined by two coordinates [$X_i$, $Y_i$]. Again, the unit of distance of the axes is mm. In the image-based coordinate system the origin (0,0) is at the centre of the CCD detector array. When viewed from behind the array, the $x_i$-axis runs horizontally and leftward from the origin (0,0) to the point (1.96585,0) and the $y_i$-axis runs vertically and upward from the origin (0,0) to the point (0,1.6084). Hence the CCD detector array fills an area of 3.9317×3.2168 mm. The point ($x_c$,$y_c$,-n) in the camera-based coordinate system is equivalent to the point ($x_i$,$y_i$) in the image-based coordinate system.

The CCD detector array offers (352×288 pixels) resolution. The mapping of the corners of the array (defined in the image-based coordinate system) to image pixels ($x_{ip}$,$y_{ip}$) is shown in the table below:

| ($x_i$, $y_i$) | ($x_{ip}$, $y_{ip}$) |
|---|---|
| (−1.96585, −1.6084) | (0, 0) |
| (1.96585, −1.6084) | (352, 0) |
| (−1.96585, 1.6084) | (0, 288) |
| (1.96585, 1.6084) | (352, 288) |

Hence it will be realised that the relationship between the image-based coordinate system and the image pixels is:

($xi$,$yi$)⇔(0.01117[$x_{ip}$−176],0.01117[$y_{ip}$−144]) for 0≤$x_{ip}$≤352 & 0 ≤$y_{ip}$≤288      Relation 2:

The general relation between the display-based coordinate system and the camera-based coordinate system can be expressed by a rigid body transform. A rigid body transform is an arbitrary concatenation of scale, translate and rotate transforms.

The x-coordinate of an object point 305 defined in the display-based coordinate system can be transformed into the x-coordinate of a point defined in the camera-based coordinate system according to the following equation:

$x_{co} = m_{00}x_s + m_{01}y_s + m_{02}z_s + m_{03}$ where $m_{ab}$ are coefficients of the transformation.

Similarly for the y and z-coordinates:

$y_{co} = m_{10}x_s + m_{11}y_s + m_{12}z_s + m_{13}$ $z_{co} = m_{20}x_s + m_{21}y_s + m_{22}z_s + m_{23}$.

These three equations can be neatly combined into the following matrix equation:

Relation 3:

$$\begin{bmatrix} x_{co} \\ y_{co} \\ z_{co} \\ 1 \end{bmatrix} = T \begin{bmatrix} x_s \\ y_s \\ z_s \\ 1 \end{bmatrix}$$

$$= \begin{bmatrix} m_{00} & m_{01} & m_{02} & m_{03} \\ m_{10} & m_{11} & m_{12} & m_{13} \\ m_{20} & m_{21} & m_{22} & m_{23} \\ 0 & 0 & 0 & 1 \end{bmatrix} \begin{bmatrix} x_s \\ y_s \\ z_s \\ 1 \end{bmatrix}$$

-continued $$= \begin{bmatrix} m_{00}x_s + m_{01}y_s + m_{02}z_s + m_{03} \\ m_{10}x_s + m_{11}y_s + m_{12}z_s + m_{13} \\ m_{20}x_s + m_{21}y_s + m_{22}z_s + m_{23} \\ 1 \end{bmatrix}$$

where T is the transformation matrix.

It is also possible to derive a relationship between the camera-based coordinates of an object point within the field of view of the camera and the image-based coordinates of the image of that object point formed on the camera's CCD detector array.

A triangle Q is defined in front of the camera lens system by the following (FIG. 3c):
1. The plane $y_c = 0$ (which, it will be remembered, is a plane bisecting the camera lengthways at right angles to the axis $y_c$,
2. The projection, onto the plane $x_c = 0$ (a plane also bisecting the camera lengthways at half the height of the CCD detector array), of the line passing through the object point 305 and the centre of the camera lens system 209,
3. The plane $z_c = z_{co}$ (a plane at right angles to the longitudinal axis of the camera and passing through the object point 305).

A further triangle R, which is similar (in the relative length of its sides) to triangle Q, is defined behind the lens system by the following:
4. The plane $y_2 = 0$ (as above),
5. Line 2 above,
6. The plane of the CCD detector array.

Since triangles Q and R are similar it follows that the relation between the camera-based coordinate system and the image-based coordinate system (ignoring sign changes) can be expressed as:

$$\frac{y_{co}}{z_{co}} = \frac{y_i}{n}$$

Likewise:

$$\frac{x_{co}}{z_{co}} = \frac{x_i}{n}$$

Or by rearranging and taking sign changes into account:

Relation 4:    $y_i = -n\frac{y_{co}}{z_{co}}$

Relation 5:    $x_i = -n\frac{x_{co}}{z_{co}}$

The combination of these two relations and the above matrix equation define a relation:

$(x_s, y_s, 0) \Rightarrow (x_i, y_i)$ mapping any point on the display which is in the field of view of the camera to a corresponding point in the image formed on the CCD detector array.

The computer 111 (FIG. 1) operates under the control of software executable to carry out a display location calculation process. As will be understood by those skilled in the art, any or all of the software used to implement the invention can be contained on various transmission and/or storage media 123 such as floppy disc, CD-ROM or magnetic tape so that it can be loaded onto the computer 111 or could be downloaded over a computer network using a suitable transmission medium. The display location calculation process will now be described in greater detail with reference to the flow chart in FIG. 4.

The display location calculation process begins with the acquisition (step 401) of display data generated on the display screen 123 by the computer 111 and storing it in the data constant memory 121. Then image data defining the latest camera image is acquired by the computer 111 (step 403) and stored in the data constant memory 121. The display data and camera data just acquired are then compared in order to derive the transformation parameters ($m_{ab}$ above) representing the transformation from the display-based coordinate system to the camera-based coordinate system (step 405). After that the parameters defining the 3D relationship that defines the position and/or orientation of the camera 207 (and hence the pointer device 103) relative to the display screen 123 are calculated (step 407). Then the intersection point between the longitudinal axis of the camera and the surface of the display screen 123 is calculated (step 409). The software then controls the computer 111 to add a cursor (step 411) within the display at the point of intersection calculated in step 409. Thereafter, all the above steps 401–411 are repeated in order to maintain fine control of the cursor by the movement of the pointing device. The recalculation of the cursor position should take place as often as possible using the spare processing power of the CPU however ideally it should take place as often as with a standard computer mouse; i.e. about 40 times per second.

An optional extension to the above process involves a step 413 which provides the history of the position and/or orientation of the camera relative to the display screen (in the form of previously used transformations) to step 405 which derives the parameters of the mapping from the display-based coordinate system to the camera-based coordinate system. This is preferred because starting with a good estimate of the correct position and/or orientation will reduce the processing required.

The display location calculation algorithm steps described above will now be described in further detail.

Acquiring the display data (FIG. 4, step 401) involves acquiring the digitally quantised intensity levels of the outputted pixels displayed on the display screen 123 in one or more colour bands c. An intensity (black and white) image has only one band whereas an RGB (truecolour) image has three colour bands; that is red, green and blue.

The display pixel intensity values in each colour band c are samples of the display intensity function $S_c(x_{sp}, y_{sp})$. The number of samples depends upon the resolution of the display screen 123. As described above the display screen 123 offers VGA resolution (640×480 pixels). The position of the display screen pixel (306,204) at display-based coordinates (153,102,0) is shown in FIG. 3a. The display screen pixel intensity value for the display screen pixel (306,204) in the green band is the sample value of $S_g$ (306,204).

The display screen pixel intensity values for all samples are stored as a 2D array referred to as $S_{csample}$. For example, the above sample value of $S_g$ (306,204) is stored in $S_{gsample}$ at position (306,204).

The display pixel colour values are samples of the display colour function $S_{colour}(x_{sp}, y_{sp})$ which is a function of the display pixel intensity values in each colour band such that $S_{colour}(x_{sp},y_{sp})=S_R(x_{sp},y_{sp})S_G(x_{sp},y_{sp})S_B(x_{sp},y_{sp})$. The display pixel colour values for all samples are stored as a 2D array referred to as $S_{colour}$. For example, the colour value for the display pixel (306,204) is stored in $S_{colour}$ at position (306,204).

Acquiring the image data (FIG. 4, step 403) involves acquiring the digitally quantised intensity levels of the pixels of the image captured on the camera's CCD detector array in one or more colour bands c.

The image pixel intensity values in each colour band, c, are samples of the function $I_c(x_{ip},y_{ip})$. The number of samples depends upon the resolution of the CCD detector array. As described above the CCD detector array offers (352×288 pixels) resolution. The position of the image pixel (90,70) at image-based coordinates (−0.96062,−0.82658) is shown in FIG. 3b. The image pixel intensity value for the pixel (90,70) in the red band is the sample value of $I_r(90,70)$.

The image pixel intensity values for all samples are stored as a 2D array referred to as $I_{csample}$. For example, the above sample value of $I_r(90,70)$ is stored in $I_{rsample}$ at position (90,70).

The image pixel colour values are samples of the image colour function $I_{colour}(x_{ip},y_{ip})$ which is a function of the display pixel intensity values in each colour band such that $I_{colour}(x_{ip},y_{ip})=I_R(x_{ip},y_{ip})I_G(x_{ip},y_{ip})I_B(x_{ip},y_{ip})$. The display pixel colour values for all samples are stored as a 2D array referred to as $I_{colour}$. For example, the colour value for the display pixel (90,70) is stored in $I_{colour}$ at position (90,70).

Figure 4:
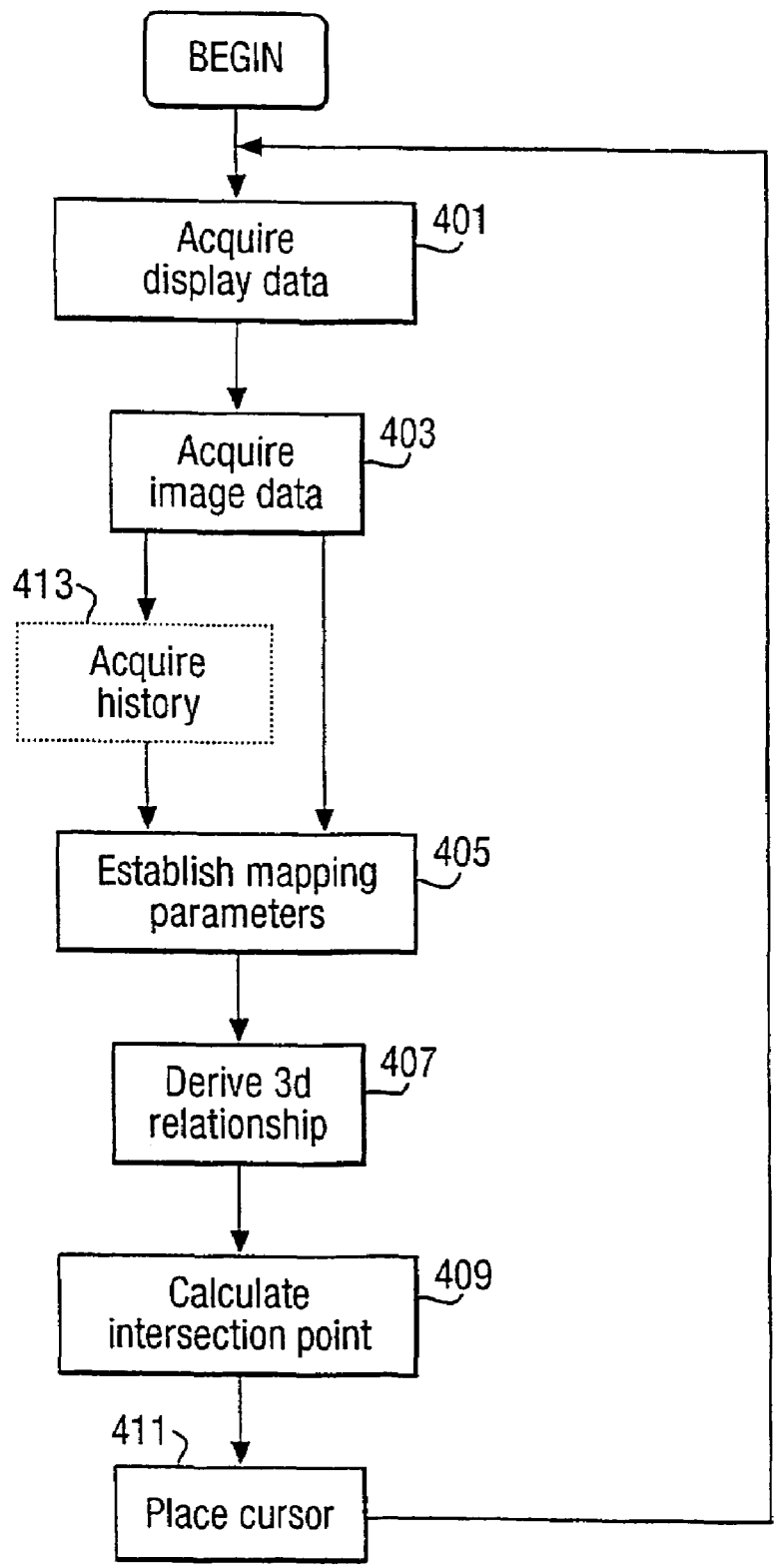
FIG. 4 is a flow diagram illustrating the operation of the pointer device control process.
Figure 5A:
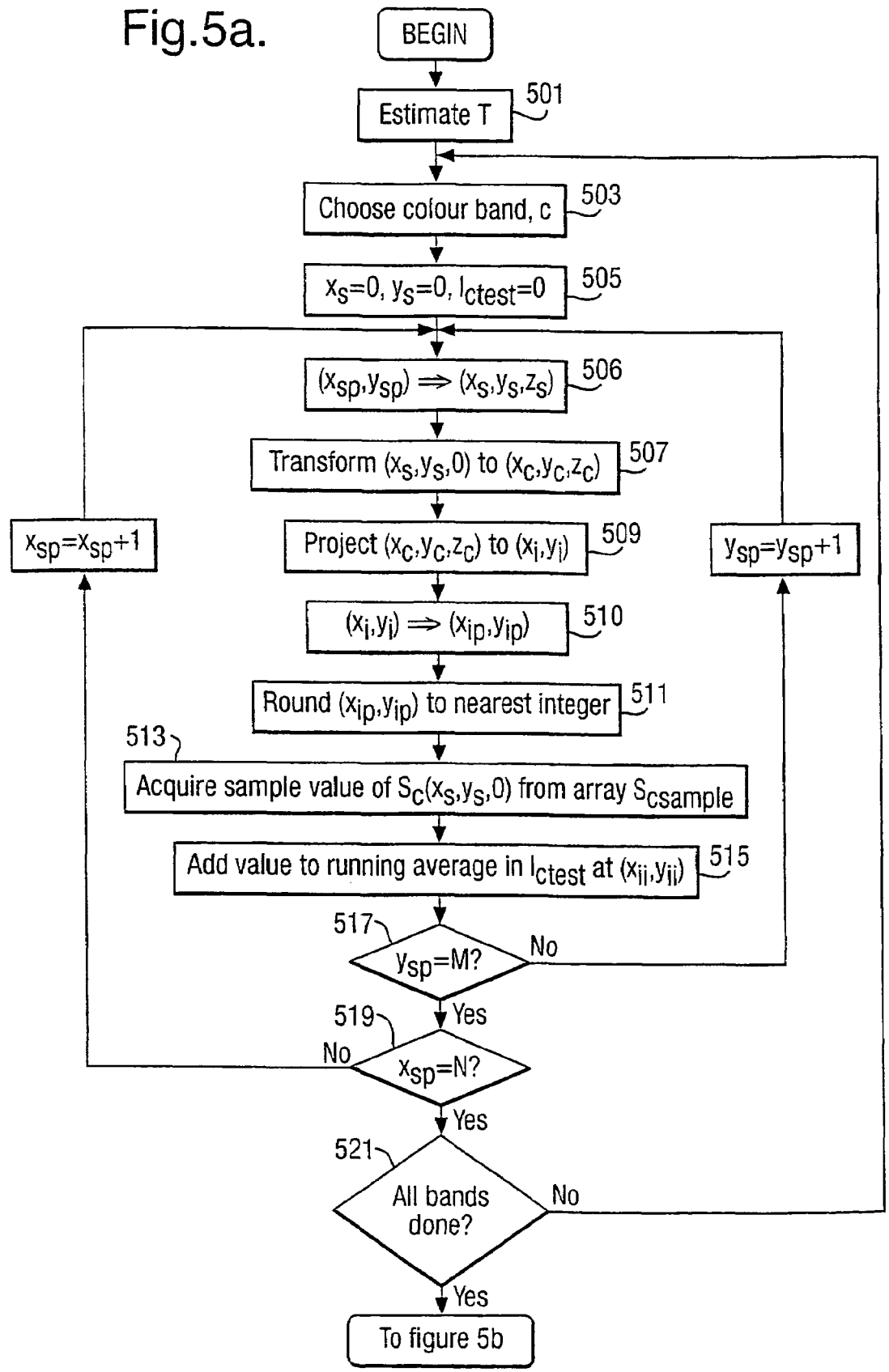
FIG. 5a is a flow diagram showing in greater detail the stage in the mapping parameter establishment step of FIG. 4 that transforms and projects the display in the display-based coordinate system to form a test image in the image-based coordinate system.
Figure 5C:
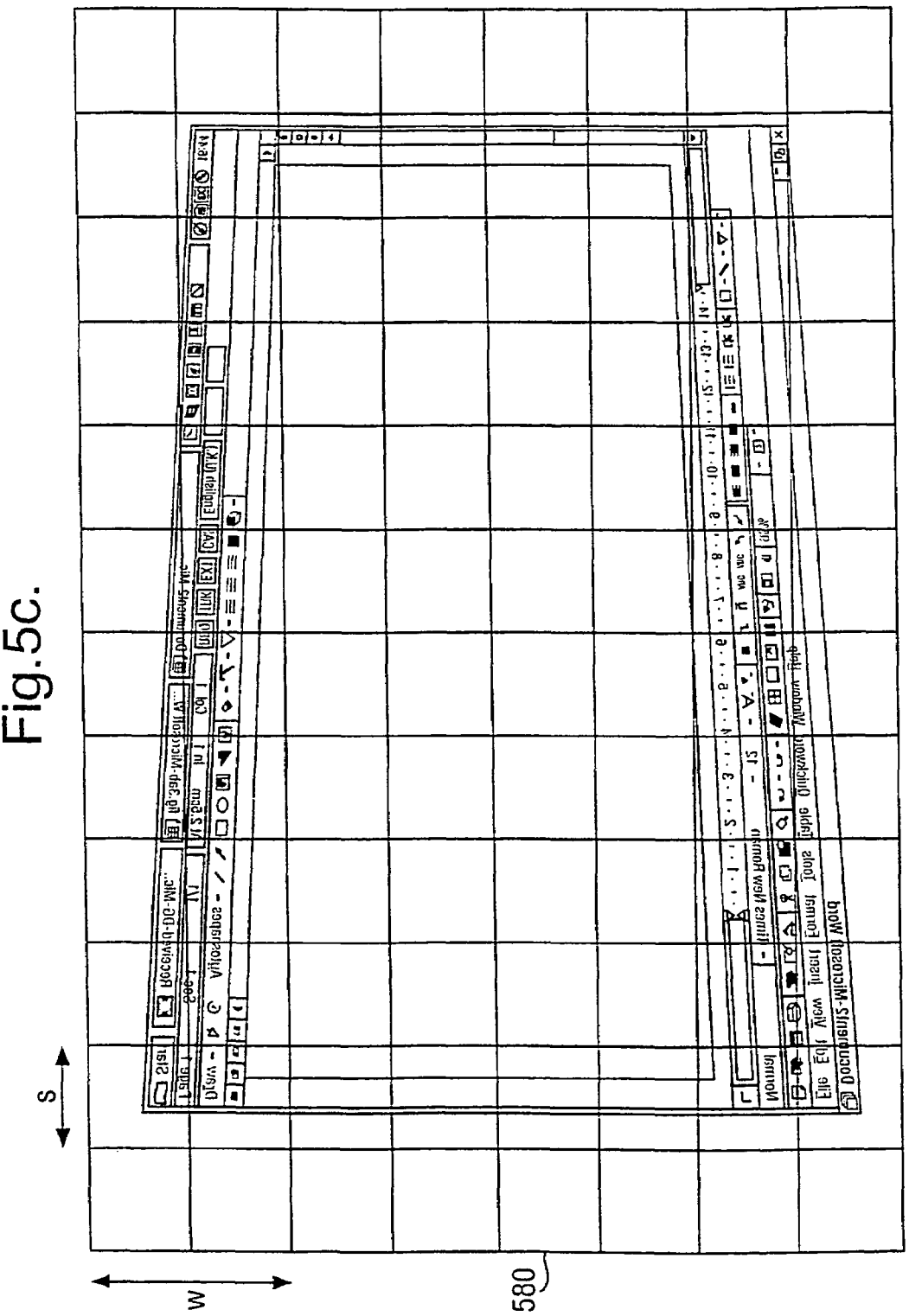
FIG. 5c is a diagram showing the filter windows and filter step size of the camera image.

Referring to FIGS. 5a and 5b, the derivation of the transformation parameters representing the transformation from the display-based coordinate system to the camera-based coordinate system (FIG. 4, step 405) will now be disclosed in greater detail. The purpose of the derivation of the mapping parameters is to determine the transform that most closely describes the relationship between the display-based coordinate system and the camera-based coordinate system.

Once a best fit transform has been identified, the mathematical relationship between the display-based coordinate system and the camera-based coordinate system can be determined. In other words, the 3D position of the camera relative to the display screen 123 and the orientation of the camera axis can be determined (FIG. 4, step 407), since every position and/or orientation of the camera (apart from those positions where the display screen is not visible) will result in a unique image of the display screen 123 in the camera 207.

Referring to FIG. 5a, a test image is generated by applying a hypothetical transform T to the current display image displayed on the display screen 123. This test image will be a very close approximation to the way the camera image should look assuming T was the correct rigid body transform that would transform the display image to look like the camera image.

An initial hypothesis is made (step 501) regarding the relationship of display screen and camera and represented by the rigid body transform T mapping points in the display-based coordinate system to the camera-based coordinate system. The information from step 413 regarding the history of the position and/or orientation of the camera relative to the display screen 123 provides important clues and may be used in forming the hypothesis. For example, the last position of the cursor can be used in the initial hypothesis. The 'rate of change of position', or velocity, over the last two positions can improve the estimate and the acceleration can improve the estimate further still. Where no suitable hypothesis exists a default relationship of perpendicular to the display screen may be assumed as a starting point.

A colour band c is selected (step 503) from one of the available colour bands. Then, all values in an array $I_{ctest}$ are set to zero and the pixel (0,0) displayed on the display screen 123 is selected (step 505). The coordinates $(x_s,y_s)$ of the point mapping to this pixel are then calculated (step 506) using relation 1 and this point is then transformed first from the display-based coordinate system into the camera-based coordinate system using relation 3 (step 507) and subsequently from the camera-based coordinate system to the image-based coordinate system using relations 4 & 5 (step 509). After that these image-based coordinates are converted into image pixel positions $(x_{ip},y_{ip})$ using relation 2 (step 510). It may be necessary to round the image pixel positions to the nearest integer value (step 511). Then the sample value of the display intensity function $S_c(x_{sp},y_{sp})$ is acquired from the array $S_{csample}$ (step 513). This value is added at position $(x_{ip},y_{ip})$ to the running average in the array $I_{ctest}$ storing the predicted image intensity values. A running average is needed since the array $I_{ctest}$ is the same size as $I_{csample}$ and is hence smaller than $S_{csample}$. The value stored in any one position in $I_{ctest}$ may therefore be the average value of a number of display pixels that map to the image pixels represented by that position.

Tests are performed (steps 517 and 519) to check whether the intensity contribution of all display pixels has been accounted for in $I_{ctest}$. If not then steps 506 to 515 are repeated for the next display pixel. If all display pixels have been accounted for then a further test is carried out (step 521) to determine whether or not $I_{ctest}$ has been estimated for all colour bands c. If not then steps 503 to 519 are repeated for the next colour band.

The test image generated as described above and stored in the array $I_{ctest}$ and the camera image captured by the camera and stored in the array $I_{csample}$ can be compared to form a real-valued number indicating the discrepancy between the images. This discrepancy can be minimised through iterative testing-according to any well-known error minimisation algorithm.

Referring to FIG. 5b, the procedure to compare the test image and camera image in order to minimise the discrepancy (and hence determine the transformation parameters) will now be described in greater detail.

Initially, the error is set to zero and the index numwindows is initialised (e.g. at zero) (step 530). Then a colour band c is chosen (step 531) from one of the available colour bands. Referring now to FIG. 6c the real image (and similarly, but not shown, the test image) are split up into (w×w) pixel sized windows 580. Each filter window overlaps the neighbouring filter windows by s pixels in both the horizontal and vertical directions and s will be referred to as the filter window step. Smaller filter windows provide a more accurate solution but involve more processing. Good compromise values are w=128 and s=32.

Referring once again to FIG. 5b, the indexes u and v are initialised (e.g. at zero). Then the sum of the intensity contributions stored in $I_{csample}$ of all the pixels (w×w) in the first real image filter window is calculated and stored as a variable $I_{csamplesum}$ (step 535) and the sum of the intensity contributions stored in $I_{ctest}$ of all the pixels (w×w) in the first test image filter window is calculated and stored as a variable $I_{ctestsum}$ (step 537).

A running total of the squared_error is calculated (step 539) using the formula $$\text{squared\_error}=\text{squared\_error}+(I_{csamplesum}-I_{ctestsum})^2$$

and then the index numwindows is advanced by one (step 541). After that tests are performed (steps 543 and 545) to determine whether the contribution of all the pixels in the two pixel images (the camera image and test image) have been accounted for in the error calculation. If not then steps 535 to 541 are repeated for the next filter window. Otherwise a further test is performed (step 547) to determine whether or not all colour bands c have been taken into account. If not then steps 531 to 545 are repeated. If all colour bands have been accounted for the average error is calculated (step 549) from the running totals of the error and the index numwindows such that:

mean_squared error=squared_error/numwindows

The root mean squared_error is then calculated (step 551). The RMS error represents the discrepancy between the two images for the transform estimated in step 501. This RMS error along with other RMS errors representing the discrepancy between the two images for a different transform T are then iteratively tested according to any well-known error minimisation algorithm (e.g. gradient descent) to determine which transform T gives the minimum discrepancy.

When the minimum RMS error is found the (known) transformation parameters (including the transform T) that map the display image in the display-based coordinate system to the test image in the image-based coordinate system are assumed to be the (unknown) transformation parameters that map the display image in the display-based coordinate system to the camera image in the image-based coordinate system. Hence the 3D relationship that defines the position and/or orientation of the camera 207 (and hence the pointer device 103) relative to the display screen 123 is derived (FIG. 4, step 407).

If, however, at this stage the error has not been minimised, the hypothesis of the transform T is refined and retested according to the foregoing procedure.

In a preferred embodiment, rather than starting with an estimate for the transform T as in step 501 in FIG. 5a, an attempt is made to match four points that are visible in the display image to four corresponding points in the camera image. Since for four correspondences relations 3, 4 and 5 above simplify to a system of 8 equations in 8 unknowns, knowledge of these four corresponding points enables an exact solution for the transform T to be found.

The process of matching corresponding points and deriving a solution for transform T will now be described. In this preferred embodiment, regions of homogeneous colour are identified in order to find corresponding points on the borders of these regions. However, those skilled in the art will recognise that such regions are only an example of a feature that can be detected in the camera image. Any other feature that can be detected in the camera image despite the transformation which the display image goes through when captured by the camera could be used.

The first stage in the process is to assign each display pixel and each image pixel to exactly one identifiable region, based on the colour value of the pixel which, it will be remembered, is a sample of the colour function at that pixel. At this point it is worth defining two additional arrays: $S_{region}$ and $I_{region}$ relating to the display pixels and image pixels respectively. These 2D arrays store the identity of the region to which pixels are assigned (or store an indication that pixels have yet to be assigned to a region). For example, the region identifer R1 stored at position (34,78) in array $S_{region}$ indicates that display pixel (34,78) has been assigned to region R1. As a further example, 0 (zero) stored at position (10,23) in array $I_{region}$ indicates that image pixel (10,23) remains unassigned.

The assigning of the display pixels to regions is achieved as follows. A display pixel $(x_{sp}, y_{sp})$ that has yet to be assigned to a region is assigned to a region R1, where R1 is a unique identifier for this new region. The region identifier R1 is therefore stored in the array $S_{region}$ at position $(x_{sp}, y_{sp})$. The colour value for pixel $(x_{sp}, y_{sp})$ is then read from the array $S_{colour}$. The neighbours of pixel $(x_{sp}, y_{sp})$ (i.e. pixels $(x_{sp}-1, y_{sp})$, $(x_{sp}+1, y_{sp})$, $(x_{sp}, y_{sp}-1)$ and $(x_{sp}, y_{sp}+1)$) are then also assigned to region R1 (assuming they have not been assigned to another region already) if their colour values are the same as (or within a predetermined threshold limit of) the colour value of pixel $(x_{sp}, y_{sp})$. If any of the neighbours of pixel $(x_{sp}, y_{sp})$ has a colour value that does not meet this criteria then it is left unassigned. This process of checking unassigned neighbouring pixels and either assigning them to region R1 or leaving them unassigned continues until the boundaries of the region R1 have been found. Then one of the pixels left unassigned (preferably the closest unassigned pixel to pixel $(x_{sp}, y_{sp})$ is assigned to a second region R2 and the process is repeated. Ultimately, each display pixel will be assigned to exactly one identifiable region.

By counting the number of occurrences of each region identifier (e.g. R1, R2 . . . ) in the array $S_{region}$, it is possible to identify the largest region in the image. It is then possible to identify all the pixels on the border of this largest region. This can be achieved by identifying all pixels assigned to the largest region which have at least one neighbouring pixel which has been assigned to a different region. The curvature of the border at each of these border pixels (i.e. the rate of change of the slope of the border at each of these pixel locations) can then be calculated and the four corners of the region (i.e. points of high curvature where the curvature is above a predetermined threshold value) can be identified. The result is a set of unique, identifiable points: the four corners of the largest region in the display image.

The assigning of the image pixels to regions and the derivation of the corner points of the largest region in the camera image is achieved in a similar way to that described above in relation to the display pixels.

The next stage in the process is to match the four corners of the largest region in the display image to the four corresponding corners of the largest region in the camera image. Using the pixel coordinates of these four corresponding pairs of points, a solution for the transform T can then be found by solving the equations that result from the simplification of relations 3, 4 and 5 above.

The above preferred embodiment utilises a process known in the art as feature matching. The process described above is a simple example of such a process and those skilled in the art will recognise that a more sophisticated approach is possible.

Figure 6:
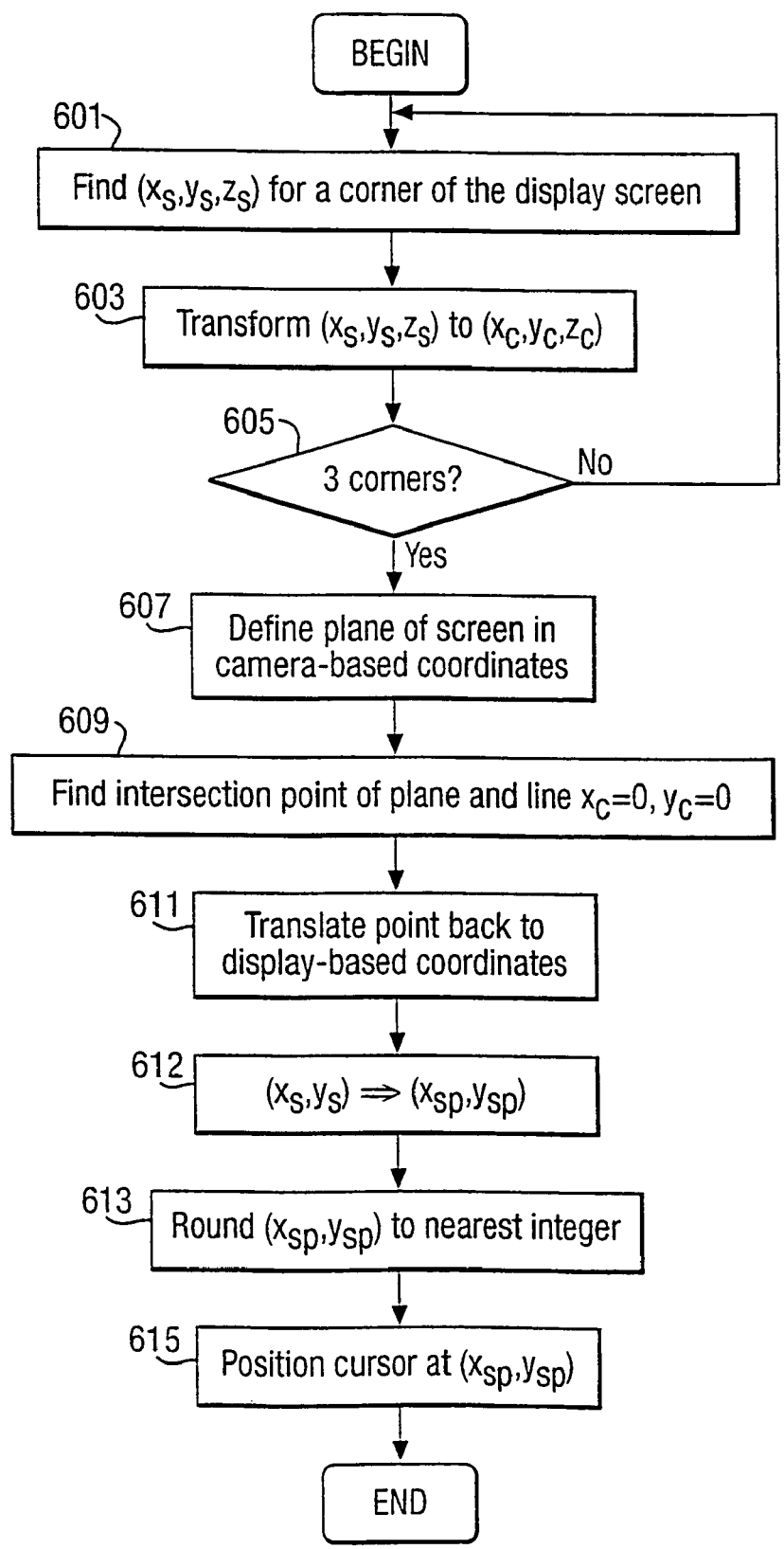
FIG. 6 is a flow diagram showing in greater detail the steps of FIG. 4 that calculate the intersection point and position the cursor.

Given that in general the transform T can translate any point in the display-based coordinate system into a point in the camera-based coordinate system, it can therefore translate the display-based co-ordinates of the corners of the display screen into positions in camera-based coordinates (FIG. 6, steps 601 and 603).

A test is then carried out (step 605) to check whether the coordinates of 3 corners of the display screen have been translated into camera space. If not steps 601 to 603 are repeated.

Three points in a Euclidean space define a plane and hence once the coordinates of 3 corners of the display screen have been translated into camera-based coordinates, the formula for the plane of the display screen $z_s=0$ can be determined in terms of camera-based coordinates (step 607). After that the intersection point between the line $x_c=0, y_c=0$ (the axis of the camera's view projecting from the centre of the camera's aperture 209 at [0,0,0] along the $z_c$-axis), with the plane of the display screen can be calculated (step 609 and FIG. 4, step 409). Since rigid body transformations are reversible this point is then translated back into display-based coordinates (step 611) determining the position which the cursor should adopt within the display-based coordinate system. This will be of the form $(x_s, y_s, 0)$ since the $z_s$-component of any point on the display screen plane is at $z_s=0$. After that these display-based coordinates are converted into display screen pixel positions $(x_{sp}, y_{sp})$ using relation 1 (step 612). It may be necessary to round the display screen pixel positions to the nearest integer value (step 613). Finally the software controls the computer to position the cursor at $(x_{sp}, y_{sp}, 0)$ (step 615 and FIG. 4, step 411).

This completes a single interaction of the display location calculation algorithm which is iterated to maintain fine control of the cursor by the movement of the pointer device.

Referring once again to FIG. 1, the user 101 points the pointer device 103 in such a way that its longitudinal axis intersects with the display screen 123. The user 101 can then control the cursor that appears on the display screen by moving the pointer device 103 such that it points at the part of the display screen where the user desires the cursor to be. The user 101 can use the buttons 211a and 213a to interact with the output of the computer 111 that is displayed on the display screen 123. In this way, an interface arrangement is provided between the user and the computer. For example, the user could point to different icons within the display. They could highlight specific text in a document. They could then even alter the appearance of the text by underlining it, making it bold or putting it in italics. They could operate pull down menus in order to run different programs or view files. They could change slides in a digital slide presentation. They could click on hyperlinks in an internet or intranet document. It will be clear to those skilled in the art that many more functions are available to the user of such a pointer device.

It will be apparent from the foregoing description that many modifications or variations may be made to the above described embodiments without departing from the invention. Such modifications and variations include:

For a 1024×768, 24-bit true colour display screen image, the memory occupied is nearly 2.4 megabytes. Processing all this data is intensive. In order to optimise the processing of the display screen image it may not be refreshed in every cycle of the display location calculation algorithm. The pre-processed data from the last cycle will often be sufficient and this avoids the intensive calculations required to handle the large sets of samples. Furthermore, it will be noticed that the resolution of the image captured by the camera is a great deal lower than the display screen resolution. This difference permits the pre-processing of the display screen image data to a reduced resolution in order to minimise the number of samples manipulated later in the algorithm, without a substantial loss of accuracy. This pre-processing can be done by any well known technique such as bilinear interpolation. To reduce processing time still further the pointer device can be disabled when not pointing towards the display screen. This could be done by adding another button to the pointer device housing which must be depressed when operation of the device is required and can be released in order to disable the device.

A further way to reduce processing requirements would be to take samples from the screen instead of taking the whole screen's information. This applies both to the generation of the test image (i.e. only taking a subset of available pixels from the display and mapping them to the test image), and in terms of the tests for correlation with the real image (only trying to correlate a subset of the pixels, since the others are empty—not having been mapped in the first place).

If the transformation for a very basic position and orientation of the pointer device relative to the screen was known then in the initial stages of operation the pointer device could be held in that position in order to provide the computation means with an accurate initial hypothesis for the transformation and hence reduce the processing requirements still further. Such a calibration position could, for example, be perpendicular to dead centre of the display at a distance of 300 mm. In other embodiments, known artificial and distinguishable features (e.g. a known shape of a known colour) could be introduced into the display to aid calibration. This is particularly useful when the pointer device is being used to point at complex display data such as television pictures.

Although in the above described embodiments the pointer device was used to control a cursor in two dimensions, it is possible to create a 3D pointer since the 3D position of the camera relative to the display screen and the orientation of the camera axis is known. The 3D pointer could operate in such a way that every movement of the pointer device can be traced into a 3D model in order to control a 3D interface such as those found in computer aided design (CAD) packages.

Although in the above described embodiments a cursor was included at the calculated display location, it is also a possibility not to include a cursor. Such a circumstance may, for example, arise in a computer aided design (CAD) package where the user points the device at the display and moves the device in order to change the perspective view of the object that is being designed/drawn. For example, a user may want to look at the object from underneath and by moving the device in a downward direction could rotate the view to the one that is desired.

Although in the above described embodiments the position and orientation of the pointer device relative to the display was calculated, it is also possible that only the position or the orientation is calculated. In the case of position the user of the pointer device may keep the device perpendicular to the display at all times and therefore the orientation does not change. Only the position would change. In the case of orientation the user may keep the device in the same position but merely change the direction in which they point it and hence only change its orientation.

Although in the above described embodiments the position and orientation of the pointer device relative to the display was used to control the cursor, it is also possible that only the position or the orientation is used. For example, in the case of a CAD package when a user wants to draw a straight line, it is common that all they have to do is click at the two end points of the line. A user of the device cold click at one end point and move the device in order to move the cursor to the other end point and click again. The orientation of the device would not be relevant in this case. The situation described above in relation to changing the perspective view of an object being designed/drawn is a case when only the orientation of the device is relevant.

Although in the above described embodiments the display was generated by an LCD monitor, it is possible for the display to be generated by an LCD or digital light processing (DLP) projector and projected onto a large projection screen or even a suitable wall. This is particularly useful in the context of a user needing to point to a display that is viewed by a large audience. The camera would still capture an image of the display when the user points the device at the screen or wall and the image data acquired in this way can then be used with the display data generated by the machine (to which the projector is attached) to calculate the point of intersection.

Although in the above described embodiments the pointer device was used to control a machine, it is also possible to use it merely to point to an object in the display. In this case no activation means would be needed. This is again suitable in the context of a user giving a presentation to an audience.

Although in the above embodiments a digital video camera was used, it is possible that a camera which takes a snap shot of the display could be used instead. The snap shot of the image would provide the image data, which together with the display data can be used for image registration. The snap shot would be updated with a new snap shot as often as possible using any spare processing power.

Although in the above described embodiments the camera was a manual, fixed focus camera, it is also possible to use a camera containing an auto-focus mechanism. The distance of operation criteria could then be relaxed as the camera would constantly maintain an adequate focus. This distance criteria could also be relaxed in the case of a fixed focus lens if some means were provided for entering the magnification of the optical system into the algorithm.

Although in the above described embodiments the pointer device only used one camera, it is possible to use more than one camera. In this way the intersection point of the axis of each camera and the screen may be separately identified and the combination of all the camera's positions and orientations taken as the control input. For example, it would be possible to create a glove with a camera in the end of each finger. Thus a natural form of physical manipulation can be used, e.g. gripping and dropping, using the five finger points on the screen.

In alternative embodiments, the pointer device could contain some computational means (in the form of a CPU, memory and storage devices) so that some or all of the processing requirements can be carried out by the computational means within the pointer device. For example, the pointer device can be combined with a handheld computing device such as s personal digital assistant (PDA).

The invention claimed is:

1. Display location calculation means comprising:
   a display generator arranged in operation to generate a display in response to display data generated by a machine;
   a pointer device carrying a camera operable to generate image data representing at least part of the scene within the field of view of the camera, which part, includes an image of at least a portion of the display;
   computation means arranged in operation to:
   receive said image data;
   receive said display data;
   calculate, from said image data and said display data, the position and/or orientation of said pointer device relative to said display;
   calculate a display location from said calculated position and/or orientation.

2. Display location calculation means according to claim 1 wherein said pointer device is elongate in shape and wherein said display location is the point where the longitudinal axis of said pointer device intersects with said display.

3. An interface arrangement for providing an interface between a user and a machine comprising:
   display location calculation means according to claim 2;
   wherein said computation means is further arranged in operation to control said machine in accordance with the position of the cursor.

4. An interface arrangement according to claim 3 wherein said machine comprises a computer having a processor and wherein said computation means comprises said processor.

5. An interface arrangement according to claim 3 wherein said pointer device further carries a computer having a processor and wherein said computation means comprises said processor.

6. An interface arrangement according to claim 3 wherein said machine comprises a first computer having a first processor and wherein said pointer device further carries a second computer having a second processor and wherein said computation means comprises said first processor and said second processor.

7. An interface arrangement according to claim 3 wherein said pointer device further comprises at least one activation means for use in controlling said machine.

8. An interface arrangement according to claim 3 wherein said display generator comprises a projector.

9. An interface arrangement according to claim 3 wherein said camera is a digital video camera.

10. An interface arrangement according to claim 3 wherein said camera is a fixed focus camera.

11. An interface arrangement according to claim 10 further comprising an indicator arranged in operation to indicate that the image captured by said camera is focussed.

12. An interface arrangement according to claim 3 wherein said camera has a fixed spatial relationship with said pointer device.

13. Display location calculation means according to claim 1 wherein a cursor is included in said display at said display location.

14. Display location calculation means according to claim 13 wherein the position of said cursor varies in accordance with said calculated position and/or orientation.

15. A method of calculating a display location said method comprising the steps of:
    i. generating a display in accordance with display data generated by said machine;
    ii. capturing image data representing at least part of the scene within the field of view of a camera carried by a pointer device wherein at least a portion of said display is included in said field of view;
    iii. calculating from said image data and said display data the position and/or orientation of said pointer device relative to said display;
    iv. calculating an display location from said calculated position and/or orientation.

16. A method according to claim 15 comprising the additional step of generating a cursor in said display at said display location.

17. A method according to claim 16 wherein the position of said cursor varies in accordance with said calculated position and/or orientation.

18. A method according to claim 17 wherein said pointer device is elongate in shape and wherein said display location is the point where the longitudinal axis of said pointer device intersects with said display.

19. A method according to claim 15 comprising the additional step of storing data representing the history of the position and/or orientation of said pointer device relative to said display and wherein said calculation step (iii) further takes into account said data.

20. Display location calculation means including:
    a storage medium having recorded therein a computer readable program processable to provide an interface between a user and a machine said program comprising:

display data acquisition code processable to obtain display data representing a display image data acquisition code processable to obtain from a pointer device carrying a camera, image data representing at least part of the scene within the field of view of said camera;

position/orientation calculation code processable to calculate from said display data and said image data the position and/or the orientation of said pointer device relative to said display display location calculation code processable to calculate from said calculated position and/or orientation a display location.

21. A digital data carrier carrying a computer program of instructions executable by a computer apparatus to perform the method steps as set out in claim 15.

\* \* \* \* \*